Sept. 16, 1969 L. AHRAMJIAN 3,467,572
CONSTRAINED LAYER DAMPED LAMINATE STRUCTURE
Filed Nov. 9, 1964

United States Patent Office 3,467,572
Patented Sept. 16, 1969

3,467,572
CONSTRAINED LAYER DAMPED LAMINATE STRUCTURE
Leo Ahramjian and Theodore Peng-Jung Yin, Wilmington, Del., assignors to E. I. du Pont de Nemours and Company, Wilmington, Del., a corporation of Delaware
Filed Nov. 9, 1964, Ser. No. 409,842
Int. Cl. B32b 27/40
U.S. Cl. 161—190        11 Claims

ABSTRACT OF THE DISCLOSURE

Improved bonded constrained layer damped laminated structure, the constrained damping layer consisting essentially of a specifically defined clear polyurethane composition made to reflect a maximum loss tangent to achieve a maximum damping efficiency.

---

Due to the trend toward lighter weight and higher speed machinery, it is becoming increasingly important to have available a convenient and economical means for effectively damping mechanical vibrations which otherwise would give rise to high noise level, improper operations, and eventual metal fatigue. For one or more reasons the presently available materials for vibration damping leave something to be desired. For example, asphalt is very cheap and provides fair damping; however, it becomes brittle at low temperatures and flows at elevated temperatures. Certain elastomers such as butyl rubber are cheap but cannot be cast and are not effective above room temperature. Still other alternatives, such as epoxy resins, may be inexpensive and suitable for free layer damping, but are too hard and resilient for use in constrained layer damping. Constrained layer damping is described in British Pat. No. 513,171.

It is an object of the present invention to provide economical materials which have a high loss tangent and are particularly suitable for constrained layer vibration damping. Another object is to provide such materials which can be liquid cast and which exhibit a relatively wide effective temperature and frequency range. A further object is to provide apparatus and method for utilizing these materials in constrained layer fashion. Other objects will appear hereinafter.

Figure 1:
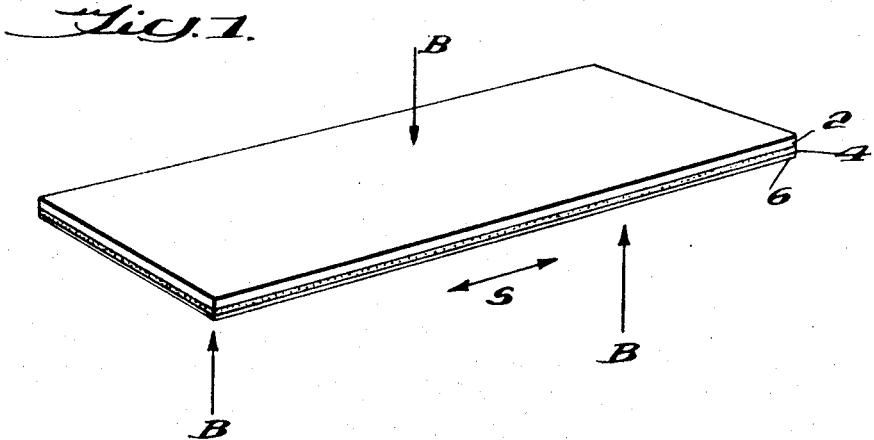
Figure 2:
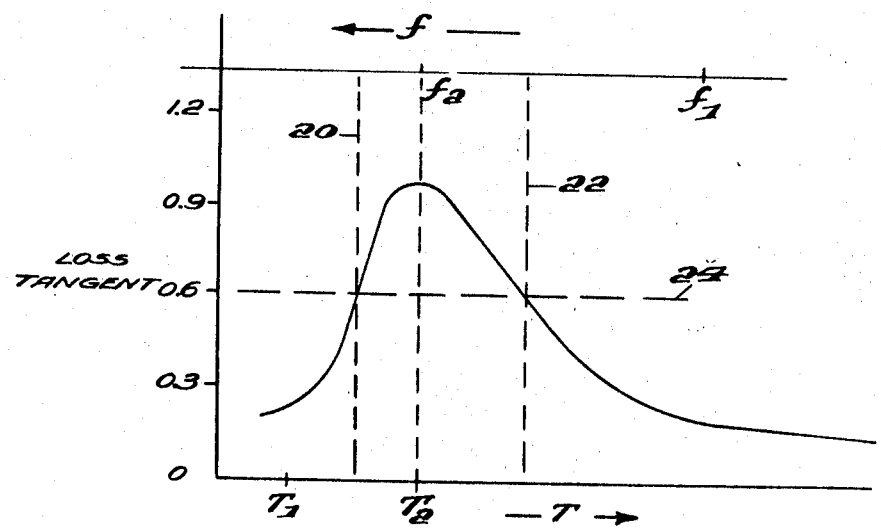

The concepts of constrained layer damping, loss tangent, and the present invention will be better understood by reference to the following description and accompanying drawings, in which:

FIG. 1 depicts a structure which is damped by the constrained layer technique; and FIG. 2 is a graph depicting the effect of temperature and frequency of vibration on the value of the loss tangent.

Constrained layer damping involves the suppression of vibration of a flexible body 2, e.g. a panel sheet, in bending motion by sandwiching a damping material 4 between the sheet and a constraining sheet 6. Under the action of bending waves, such as represented by arrows B, the constrained layer of damping material 4 is subjected chiefly to shear deformations in the direction represented by the doublehead arrow S. To obtain effective constrained layer damping, the damping material must have a high loss tangent and an appropriate elastic modulus.

The loss tangent or tangent delta is the quotient of the loss shear modulus which is representative of Newtonian liquid behavior and the elastic shear modulus representing elastic solid behavior. These moduli may be represented ideally as vectors which are 90° out of phase, with the actual response of the damping material being a vector lying somewhere between 0 and 90° to define the angle delta of which the loss tangent is representative. A high loss tangent of a damping material indicates that it will tend to act as a Newtonian liquid and dissipate the applied energy as heat instead undergoing vibrations in response to the vibration.

The loss tangent is to only a certain extent a characteristic which inheres in a particular damping material. This characteristic is in large measure affected by the temperature of use and frequency of applied vibration. In FIG. 2, T is the temperature in ° C. increasing from left to right along the abscissa and $f$ is the frequency of applied vibration in cycles per second increasing from right to left. The curve represents the dependence of the loss tangent, plotted along the ordinate, on these parameters. More particularly, at a certain low temperature, $T_1$, the loss tangent is low indicating that elastic solid behavior is predominant over the Newtonian liquid behavior. As the temperature is increased at a constant frequency of applied vibration, the value of the loss tangent increases, thus indicating good damping ability. At temperature $T_2$ a maximum value for the loss tangent is reached and thereafter it declines to return to the previous elastic predominating behavior, with the total temperature change to produce this change in properties being only about 50° C.

In similar fashion, as the frequency of applied vibration is increased at constant temperature from a value $f_1$, the loss tangent undergoes first an increase to a maximum of $f_2$ and then a decrease. Unlike the temperature caused variation, however, the frequency change to produce the similar result may cover tens of thousands of cycles per second. Thus, vibration damping by conversion of mechanical energy to heat is quite sensitive to relatively slight changes in temperature but is less affected by variations in the frequency of vibration. For a particular application while the loss tangent at $T_2$ is most preferred, the loss tangent of 0.6 is satisfactory and hence, a range of useful temperature and frequency can be determined by constructing ordinate axes 20 and 22 from the points on the curve which intersect with the loss tangent 0.6 abscissa axis 24.

The present invention provides a means for selecting polyurethane compositions having the maximum loss tangent occur at some particularly desired frequency and temperature, whereby the damping efficiency and range of usefulness of the composition will be at a maximum. It has been discovered that a particular class of polyurethanes are related to the parameters of temperature (T, ° C.) and frequency ($f$, cycles per second) by the formula $$W = -A\left(\log_{10} f - \frac{T-25}{10}\right) + B$$

wherein A is from 4 to 7 and B is from 40 to 70 (neither A nor B need be an integer) and wherein W is the amount in parts by weight of an aromatic diisocyanate of molecular weight up to about 300 to react with (1) 100 parts by weight of polypropyleneether glycol having a number average molecular weight between 750 and 2500 and (2) an amount in parts by weight of low molecular weight aliphatic diol or triol sufficient to react with 70 to 100% of the NCO groups in excess of those required to form a bis-urethane from each molecule of said polypropyleneether glycol.

The optimum values of A and B for some of the typical and preferred aromatic diisocyanates are as follows:

| Diisocyanate | A | B |
|---|---|---|
| Toluene diisocyanate | 5.5 | 55 |
| Ring-dichlorinated toluene diisocyanate | 6.8 | 66 |
| Methylene bis(4-phenylisocyanate) | 6.6 | 62 |
| Naphthylene diisocyanate | 4.5 | 53 |
| Paraphenylene diisocyanate | 5.0 | 44 |

For these diisocyanates as well as others within the scope of this invention, the values for A and B can fall anywhere within the respective ranges given.

The polyurethane layer is interposed, as shown in FIG. 1 as damping material 4, between a conventional base panel such as the flexible body 2 and a conventional constraining sheet 6. The polyurethane is applied to reduce the amplitude of a steadily applied wave or to increase the decay rate of a transient wave by increasing the capacity of the composite panel to dissipate the energy. Since the polyurethane elastomer composition is established through knowledge of the mechanical vibration frequency to be damped and the temperature at which the damping action is to take place, the composition will have a maximum capability of damping the vibration. It is another important feature of this invention that the polyurethane so prepared will exhibit usefulness through a range of temperatures and vibration frequencies. Polyurethane elastomers prepared in accordance with the formula will have Bashore resilience at 25° C. (about 100 c.p.s.) of 15 or less and a Yerzley resilience at 25° C (about 5 c.p.s.) of 30 or less elastomers having the dynamic characteristics indicated by the loss tangent and resilience values just recited are highly suited for use in constrained layer vibration damping applications In order to obtain efficient damping, current constrained layer damping theory, as represented by Structural Damping, Section 3, ASME publication, New York (1959), page 49, dictates that in addition to exhibiting a high loss tangent, the modulus and thickness of the middle damping layer be properly matched to the moduli and thicknesses of the two adjoining metal layers. It is significant to note that in commonly employed constrained layer laminates where the polymer thickness is approximately ½ that of base plate (panel to which vibration is applied) and constraining layer thickness is approximately ¼ that of base plate, the dynamic sheer moduli of the above polyurethanes are in the correct range necessary for optimum damping. These relative thicknesses are applicable in the present invention. Minor adjustments of the dynamic sheer modulus of the constrained layer can easily be made by addition of an inert filler such as a very fine grade of silica.

The damping layer of polyurethane elastomer is not merely a separate and discrete layer but is bonded by known methods to the opposed sheets 2 and 6 so as to form a laminated structure wherein the elastomer adjacent the boundary between damping layer and sheets 2 and 6 tends to travel therewith whereby relative movement between sheets 2 and 6 is translated into shear within the damping material 4. The laminates prepared in accordance with the present invention can be operated over a very wide temperature range, namely from about −20° C. to about +80° C. Operation at temperatures above about 80° C. is not desired because of the possible adverse effect on the polyurethanes resulting from their prolonged exposure to high temperatures. At temperatures below about −20° C. the polyurethanes frequently become too hard for laminates subjected to vibrations in the frequency range of usual interest. Although specific polyurethanes prepared according to the present invention are not applicable over the entire range, the formula previously given indicates the composition to be used for temperatures within this range. It is surprising that compositions consisting of the same basic ingredients can be used over such a broad temperature range.

The polyurethane which is employed as a constrained layer damping material is made by reacting polypropyleneether glycol, an aromatic diisocyanate, and a low molecular weight polyol. A closely related polyether, e.g., polytetramethyleneether glycol, is not a suitable substitute for the polypropyleneether glycol because the compositions made up in accordance with the present equations are too resilient The molecular weight range selected is based on the need to avoid both the extremes of softness (a tendency more prominent as molecular weights above 2500 are employed) or undue hardness (a tendency noted as molecular weight glycols below 750 are used). It has been observed that the dynamic properties of the polyurethanes can be kept about the same with different molecular weight polypropyleneether glycols if the weight ratio of diisocyanate to glycol is kept constant. An upper limit to the molecular weight is necessary since polymers having molecular weights above 1000 become progressively more resilient and rubbery. When the molecular weight is above 2500 the polyurethane is too resilient for effective vibration damping. As the molecular weight of the polypropyleneether glycol drops below 750, the product polyurethane displays a decreasing amount of flexibility, and hard, plastic-like and resilient polymers result. The preferred molecular weight range is about 900–1100. It is to be understood that glycols in the range of 100 to about 4000 can be mixed to give a number-average molecular weight in the specified range.

A wide variety of aromatic diisocyanates can be employed. In general, their molecular weight can range up to about 300. Representative aromatic diisocyanates include 4,4′-methylenebis(4-phenylisocyanate), the toluene diisocyanates, ring-dichlorinated toluene diisocyanates, meta-phenylene diisocyanate, and paraphenylene diisocyanate.

The remaining component is the low molecular weight aliphatic polyol having a molecular weight of less than 350 and usually less than 200. The selection of the polyol component should be such that the production of crystalline polyurethanes as evidenced by opacity and unduly high hardness is avoided. Such polyurethanes are too hard and resilient for efficient use in constrained layer vibration damping applications. In other words, the low molecular weight glycol should be chosen to yield a polyurethane which is "clear"; this desired characteristic provides an easy test for determining whether or not a particular diol or triol is suitable. The preferred diols are 1,3-butanediol, neopentyl glycol, and 2-methyl-2-ethyl-1,3-propanediol. It has been found that even with highly symmetrical diisocyanates such as paraphenylene diisocyanate, the use of these diols will prevent crystallinity. However, one skilled in the art can select from other diols which may be equally acceptable.

Triols, such as trimethylolpropane and 1,2,6-hexanetriol, may be susbtituted for part of the diols. With the preferred diols listed above, an appropriate level of triol corresponds to that amount capable of reacting with 0–45% of the available isocyanate (excess of NCO groups over polyether glycol hydroxyl groups). If more of the low molecular weight polyol is supplied by triol, the polymer product tends to be harder and too resilient for suitable vibration damping. Again, one skilled in the art can select from many possible combinations of diol and triols to arrive at a suitable product. For example, the use of triol with a diol which by itself will induce crystallinity may give rise to an acceptable clear product.

The polyurethane products of the present invention can be made by reacting the above-specified components according to the procedures familiar to those skilled in the polyurethane technology. The examples which follow illustrate representative conditions. Typically, the polyether glycol and the aromatic diisocyanate are stirred under nitrogen at temperatures in the range from about room temperature to about 100° C. until the theoretical NCO content is obtained as determined by the usual analytical techniques. A mixture of this product and the low molecular weight polyol is then degassed and molded or otherwise applied and cured in the usual manner. Alternatively, all of the components can be mixed at the same time and the resulting blend applied and cured in the usual manner. The cure cycle can be selected by those skilled in the art in accordance with the usual techniques. Temperatures such as 100–130° C. are frequently employed, shorter times being needed at the higher temperature. Representative cures are carried out for 20 hours at 100° C. or 3 hours at 130° C. When catalysts for urethane formation are present, the time can be shortened; thus the catalyzed reaction at 100° C. can often be completed in 3 hours.

The following examples, in which parts and percent are by weight unless otherwise noted, are presented merely to exemplify the present invention and accordingly, are not intended as a limitation on the scope thereof. In these examples, loss tangent measurements are made with a Fitzgerald Transducer as described in E. R. Fitzgerald and J. D. Ferry, J. of Colloid Science, vol. 8, No. 1, pp. 1–34, February 1953. Measurements of loss tangent of constrained layer structures are made with the B & K Complex Modulus Apparatus, Type 3930, available from Bruel & Kjaer, Copenhagen, Denmark.

EXAMPLE 1

It is required to formulate a polyurethane composition for optimum damping service around 25° C. and 58 c.p.s. To use toluene diisocyanate as one ingredient, compute its weight W as $$W = -5.5\left(\log_{10} 150 - \frac{25-25}{10}\right) + 55$$

$$W = 45.3$$

Thus, a mixture containing 45.3 parts by weight of a toluene diisocyanate isomer mixture (80% 2,4-; 20% 2,6-) and 100 parts of polypropyleneether glycol (PPG) (number-average molecular weight, 1000) was stirred under nitrogen for 18 hours at 80° C. to yield an NCO-containing fluid composition. The NCO content by weight (as determined by di-n-butylamine/HCl titration) was 9.2%. A mixture of 50 parts of this composition, 4.03 parts of 1,3-butanediol (BDO) and 0.75 part of 1,1,1-trimethylol propane (TMP), corresponding to 92% of NCO groups remaining, was stirred at 60° C. and after a brief period of degassing (about 10–15 seconds) under reduced pressure of about 5 mm. Hg was poured into a steel mold (preheated to 100° C.) of the desired shape which had been coated with polytetrafluoroethylene. The product obtained by heating this mixture in an air-oven for 20 hours at 100° C. had the following properties: Shore A hardness, 59; Yerzley resilience (5 c.p.s.) less than 15%; Bashore Rebound (120 c.p.s.) of 7%, and a loss tangent of 1.2 at 100 c.p.s. as measured on a Fitzgerald Transducer, all measured at 25° C. A constrained layer laminate composed of a 1/16″ layer of this polymer adhered by Eastman 910 [1] cement between a 1/8″ stainless steel panel and a 1/16″ aluminum panel exhibits an amplitude of vibration at 25° C. and 58 c.p.s. which is only about one percent of that of the original undamped stainless steel panel.

EXAMPLE 2

The procedure described in Example 1 was followed except that all four ingredients were mixed simultaneously, heated at 60° C. for 1–2 minutes with efficient stirring, followed by the degassing, pouring, and curing procedure outlined in Example 1. The cured elastomer had a Shore A hardness of 58, a Yerzley Resilience (5 c.p.s.) of less than 15% and a Bashore Rebound (120 c.p.s.) of 7%.

The following tables illustrate further details of the present invention. The loss tangent may be referred to as tan δ.

[1] Identified in brochure "TDR R–101," September 1957, by Eastman Kodak Company as methyl 2-cyanoacrylate monomer modified with thickening agent and plasticizer.

TABLE I.—EFFECT OF DIISOCYANATE STRUCTURE ON RESILIENCE OF POLYURETHANES BASED ON PPG 1000

| Gms. of diisocyanate per 100 g. PPG 1000 [1] | Diol and/or triol (g.) | Procedure (Example No.) | Prepolymer conditions | Prepolymer NCO (percent) | Mixing temp.,[2] °C. | Curing Cycle | Hardness A | Yerzley Resil., 25° C. | Bashore Rebound, 25° C. | Fitzgerald Transducer Data, Location of Loss Peak | | |
|---|---|---|---|---|---|---|---|---|---|---|---|---|
| | | | | | | | | | | tan δ | T. (° C.) | f. (cps.) |
| 45.3 g. 80/20 2,4-2,6-TDI [1] | 4.03 g. 1,3-BDO, 0.75 g. TMP/50 g. prep. or 11.72 g. 1,3-BDO, 2.18 g. TMP. | 1 | 18 hrs./80° C. | 9.2 | 60 | 20 hrs./100° C. | 59 | <15 | 7 | 1.3 | 25 | 50 |
| 55 g. Cl₂-TDI [3] | 9.18 g. 1,3-BDO, 1.08 g. TMP | 2 | | [5] 6.5 | 60 | 3 hrs./120° C. | 54 | <15 | 8 | 1.4 | 25 | 40 |
| 49.5 g. MDI [4] | 7.07 g. 1,3-BDO, 1.32 g. TMP | 2 | | [5] 5.8 | 60 | 18 hrs./100° C. | 58 | <15 | 4 | 1.3 | 25 | 75 |
| 45.6 g. NDI [4] | 8.13 g. 1,3-BDO, 1.56 g. TMP | 1 | 1 hr./90° C. | 6.9 | 80 | 18 hrs./100° C. | 75 | 16 | 12 | [6] 1.2 | [6] 25 | [6] 45 |
| 36 g. PPDI | 8.75 g. 1,3-BDO, 1.65 g. TMP | 2 | | [5] 8.0 | 100 | 18 hrs./100° C. | 65 | 17 | 9 | [6] 1.2 | [6] 25 | [6] 60 |

[1] All ratios of diisocyanate to PPG are based on the equation shown in the definition using the appropriate constants for each diisocyanate and values of temperature and frequency shown in the transducer data.
[2] Mixing temperature of procedure 2 or mixing temperature of curing step of procedure 1.
[3] 80/20 mixture of 3,5-dichloro-2,4-TDI and 3,5-dichloro-2,6-TDI.
[4] Based on PPG 1060.
[5] Calculated.
[6] Calculated from Yerzley resilience.
Abbreviations.—TDI=tolylene diisocyanate; Cl₂-TDI=ring dichlorinated tolylene diisocyanate; MDI=methylene bis(4-phenylisocyanate); NDI=1,5-naphthalene diisocyanate; PPDI=p-phenylene diisocyanate.

TABLE IIA.—EFFECT OF POLYOL STRUCTURE ON RESILIENCE OF POLYURETHANES BASED ON $Cl_2$-TDI, POLYOL 100 AND NPG [1]

| Polyol Structure | Prepolymer Conditions | Prepolymer, percent NCO | Mixing temp., °C. | Curing Conditions | Hardness A | Yerzley Resil., 25° | Bashore Rebound, 25° | Fitzgerald Data tan δ | f. (c.p.s.) | T. (° C.) |
|---|---|---|---|---|---|---|---|---|---|---|
| Polypropylene ether glycol | 2 hrs./80° C | 6.5 | 100 | 18 hrs./100° C | 56 | <15 | 8 | 1.4 | 40 | 25 |
| Polytetramethylene ether glycol | 0.5 hrs./80° C | 6.4 | 100 | 18 hrs./100° C | 56 | 51 | 17 | [3] 0.4 | [3] 40 | [3] 25 |
| Poly(ethylene adipate) glycol | 1 hr./80° C | | 100 | 18 hrs./100° C | 78 | 0 | 15 | | | |

See footnotes at end of Table IIB.

TABLE IIB.—EFFECT OF POLYOL STRUCTURE ON RESILIENCE OF POLYURETHANES BASED ON TDI, POLYOL AND 1,3-BDO/TMP [2]

| Polyol Structure | Prepolymer Conditions | Prepolymer, percent NCO | Mixing temp., °C. | Curing Conditions | Hardness A | Yerzley Resil., 25° | Bashore Rebound 25° | Fitzgerald Data tan δ | f. (c.p.s.) | T. (° C.) |
|---|---|---|---|---|---|---|---|---|---|---|
| Polypropylene ether glycol | 18 hrs./80° C | 9.2 | 60 | 18 hrs./100° C | 59 | <15 | 7 | 1.3 | 50 | 25 |
| Poly(ethylene adipate) glycol | 2 hrs./80° C | 9.2 | 60 | 18 hrs./100° C | 65 | 0 | 10 | | | |
| Polytetramethylene ether glycol | 2 hrs./80° C | 9.2 | 60 | 18 hrs./100° C | 59 | 60 | | [3] 0.3 | [3] 50 | [3] 25 |

[1] Basic Recipe: 100 g. polyol (M.W. 1,000), 55 g. $Cl_2$-TDI (80/20 3,5-dichloro-2,4-tolylene diisocyanate/3,5-dichloro-2,6-tolylene diisocyanate) and 11.15 g. neopentyl glycol (Procedure Ex. 1), based on equation in definition and values of T. and f. under Fitzgerald data.

[2] Basic Recipe: 100 g. polyol (M.W. 1,000), 45.3 g. Hylene TM, 11.72 g. 1,3-BDO, 2.18 g. TMP (Procedure Ex. 1), based on equation in definition and values of T. and f. under Fitzgerald data.

[3] Calculated from Yerzley resilience.

TABLE IIIA.—EFFECT OF MOLECULAR WEIGHT OF PPG ON RESILIENCE OF POLYURETHANES [1]

| Molecular Weight of PPG | Wt. of 1,3-BDO plus TMP | Procedure (Example No.) | Prepolymer, percent NCO | Hardness A | Yerzley Resil., percent | Bashore Rebound | Appearance |
|---|---|---|---|---|---|---|---|
| 415 | 1.36 g. 1,3-BDO, 0.28 g. TMP | 2 | [2] 1.2 | 85 | (3) | 22 | Clear-brittle. |
| 1,000 | 11.7 g. 1,3-BDO, 2.18 g. TMP | 1 | 9.2 | 59 | <15 | 7 | Clear-dead. |
| 1,880 [4] average | 10.4 g. 1,3-BDO, 2.03 g. TMP | 1 | 8.9 | 63 | <15 | 12 | Clear. |
| 2,000 | 14.35 g. 1,3-BDO, 2.65 g. TMP | 2 | [2] 12.14 | 69 | <25 | 13 | Slightly opaque. |
| 3,000 | 15.27 g. 1,3-BDO, 2.9 g. TMP | 1 | 13.05 | 57 | 27 | 16 | Opaque. |
| 4,000 | 16.0 g. 1,3-BDO, 2.9 g. TMP | 1 | 13.55 | 45 | 27 | 24 | Do. |

[1] Basic Recipe.—100 g. PPG, 45.3 g. TDI (80/20 mixture of 2,4-tolylene diisocyanate and 2,6-tolylene diisocyanate) and cured with 1,3-BDO and TMP. Prepolymers prepared by heating 18 hrs./80° C. Mixing temperatures 60° C. Curing cycle 18 hrs./100° C.
[2] Calculated.
[3] Too hard.
[4] Mixture of 25 g. each PPG 415, 1,060, 2,000, 4,000.

TABLE IIIB.—EFFECT OF MOLECULAR WEIGHT OF PPG ON RESILIENCE OF POLYURETHANE BASED ON $Cl_2$-TDI

| Gms. TDI $Cl_2$-TDI | 100 g. of PPG, M.W. | Diol and/or triol, g. | Procedure (Ex.) | Prepolymer Conditions | Prepolymer, percent NCO | Mixing temp., °C. | Curing cycle | Hardness A | Yerzley Resil., 25° C. | Bashore Rebound 25° C. |
|---|---|---|---|---|---|---|---|---|---|---|
| 55 | 1,000 | 9.18 g. 1,3-BDO 1.08 g. TMP | 2 | | [1] 6.5 | 60 | 3 hrs./120° | 54 | <15 | 8 |
| 55 | 2,000 | 11.55 g. 1,3-BDO 2.2 g. TMP | 2 | | [1] 9.2 | 60 | 18 hrs./100° | 63 | 15 | 15 |
| 55 | 3,000 | 12.6 g. 1,3-BDO 2.35 g. TMP | 2 | | [1] 10.0 | 60 | 18 hrs./100° | 77 | 29 | 30 |

[1] Calculated.

TABLE IV.—EFFECT OF LOW MOLECULAR WEIGHT DIOL STRUCTURE ON RESILIENCE OF POLYURETHANES BASED ON PPG 1000

| Gms. of diisocyanate/ 100 g. PPG 1000 | Diol (g.) | TMP (g.) | Procedure (Ex.) | Prepolymer Conditions | Prepolymer, percent NCO | Mixing temp., degrees | Curing cycle | Hardness A | Yerzley Resil., 25° C. | Bashore Rebound, 25° C. | Other Comments |
|---|---|---|---|---|---|---|---|---|---|---|---|
| 55 g. $Cl_2$-TDI [1] | 9.18 g. 1,3-BDO | 1.08 | 2 | | [3] 6.5 | 60 | 3 hrs./120° C | 54 | <15 | 8 | Clear. |
| 55 g. $Cl_2$-TDI [1] | 9.18 g. 2,3-BDO | 1.08 | 1 | 2 hrs./80° | 6.5 | 60 | 18 hrs./100° C | 87 | 42 | 39 | Opaque. |
| 55 g. $Cl_2$-TDI [1] | 11.5 g. NPG | | 2 | | [3] 6.5 | 100 | 18 hrs./100° C | 56 | <15 | 8 | Clear. |
| 36 g. PPDI | 8.75 g. 1,3-BDO | 1.65 | 2 | | [3] 8.0 | 100 | 18 hrs./100° C | 65 | 17 | 9 | Do. |
| 36 g. PPDI | 10.4 g. 1,4-BDO | | 1 | 16 hrs./70° | 8.0 | 100 | 18 hrs./100° C | 95 | (4) | 33 | Opaque. |
| 49.5 g. MDI | 8.39 g. 1,3-BDO | | 1 | 2 hrs./90°, +5 mg. T-9.[2] | 5.8 | 60 | 18 hrs./100° C | 56 | 20 | 5 | Clear. |
| 49.5 g. MDI | 8.39 g. 1,4-BDO | | 1 | 2 hrs./90°, +5 mg. T-9.[2] | 5.8 | 60 | 18 hrs./100° C | 63 | 60 | 5 | Do. |
| 49.5 g. MDI | 7.09 g. 1,3-BDO | | 1 | 2 hrs./90°, +5 mg. T-9.[2] | 5.8 | 60 | 18 hrs./100° C | 67 | 57 | 6 | Mod. opaque. |

[1] 80/20 mixture of 3,5-dichloro-2,4-tolylene diisocyanate and 3,5-dichloro-2,6-tolylene diisocyanate.
[2] Stannous octoate.
[3] Calculated.
[4] Too hard.

TABLE VI.—EFFECT OF DIISOCYANATE CONTENT ON RESILIENCE OF POLYURETHANES BASED ON PPG 1000

| Gms. of diisocyanate per 100 g. of PPG 1000 [1] | Diol and/or triol (g.) | Procedure (Ex.) | Prepolymer Conditions | Prepolymer percent NCO | Mixing Temp. (°C.) | Curing Cycle | Hardness A | Yerzley Resil., percent (°C.) | Bashore Rebound percent (°C.) | Fitzgerald Transducer Data | | | |
|---|---|---|---|---|---|---|---|---|---|---|---|---|---|
| | | | | | | | | | | tan δ | T. (°C.) | f. (c.p.s.) | |
| TDI,[2] 45.3 g | 8.06 g. 1,3-BDO, 1.5 g. TMP per 100 g. prepolymer | 1 | 18 hrs./80° C | 9.2 | 60 | 20 hrs./100° C | 59 | <15 (25°) 7 (25°) | | 1.3 | 25 | 50 | |
| | | | | | | | | | | 1.1 | 40 | 100 | |
| | | | | | | | | | | 1.2 | 25 | 3.2 | |
| | | | | | | | | | | 1.2 | 68 | 100 | |
| TDI,[2] 52.2 g | 9.0 g. 1,3-BDO, 1.68 g. TMP per 100 g. prepolymer | 1 | 18 hrs./80° C | 11.1 | 60 | 20 hrs./100° C | 75 | <15 (25°) 8 (60°) | | | | | |
| TDI,[2] 67.8 g | 13.88 g. 1,3-BDO per 100 g. prepolymer | 1 | 18 hrs./80° C | 14.4 | 60 | 20 hrs./100° C | 95 | Too hard | | | | | |
| Cl₂-TDI,[3] 24.3 g | None | 2 | | [4]6.5 | 60 | 20 hrs./100° C | 12 | <15 (25°) 8 (25°) | | 2.0 | -15 | 100 | |
| Cl₂-TDI,[3] 55 g | 9.18 g. 1,3-BDO, 1.08 g. TMP | 2 | | 7.7 | 60 | 3 hrs./120° C | 54 | <15 (25°) 11 (25°) | | 1.4 | 25 | 40 | |
| Cl₂-TDI,[3] 61.7 g | 8.62 g. NPG plus 0.18 g. TMP/100 g. prepolymer | 1 | 2 hrs./80° C | 9.4 | 100 | 18 hrs./100° C | 68 | <15 (25°) | | 1.1 | 39 | 100 | |
| Cl₂-TDI,[3] 71.5 g | 10.5 g. NPG plus 0.19 g. TMP/100 g. prepolymer | 1 | 2 hrs./80° C | | 100 | 18 hrs./100° C | 83 | 19 (25°) | | 1.0 | 52 | 100 | |
| MDI,[5] 49.5 g | 7.07 g. 1,3-BDO plus 1.32 g. TMP | 2 | | [4]5.8 | 60 | 18 hrs./00° C | 58 | <15 (25°) 4 (25°) | | 1.3 | 25 | 75 | |
| | | | | | | | | | | 1.4 | 40 | 300 | |
| | | | | | | | | | | 1.4 | 25 | 11 | |
| MDI,[5] 55 g | 8.24 g. MEPD[6] plus 0.34 g. TMP/100 g. prepolymer | 1 | 18 hrs./80° C | 6.5 | 60 | 18 hrs./100° C | 71 | <15 (25°) 11 (25°) | | | | | |

[1] All diisocyanate/PPG ratios are based on definition equation, using appropriate constants and values of T. and f. shown under Fitzgerald data.
[2] 80/20 mixture of 2,4-/2,6-tolylene diisocyanate.
[3] Ring dichlorinated 80/20 2,4-TDI/2,6-TDI.
[4] Calculated.
[5] Methylene bis (4-phenylisocyanate).
[6] 2-methyl-2-ethyl-1,3-propanediol.

TABLE V.—EFFECT OF TRIOL CONCENTRATION ON RESILENCE OF POLYURETHANES BASED ON TDI ("HYLENE") PPG 1000 AND 1,3-BDO [1]

| Wt. of 1,3-BDO (percent theory)[2] | Wt. of TMP (percent theory) | Hardness A | Yerzley Resil. 25° C. | Bashore 25° C. |
|---|---|---|---|---|
| 4.54 g. (90%) | | 58 | <15 | 9 |
| 4.03 g. (80%) | 0.75 g. (15%) | 59 | <15 | 7 |
| 3.28 g. (65%) | 1.25 g. (25%) | 61 | <15 | 9 |
| 2.77 g. (55%) | 1.77 g. (35%) | 63 | <15 | 9 |
| 2.27 g. (45%) | 2.27 g. (45%) | 70 | <15 | 15 |
| | 4.54 g. (90%) | 83 | ([3]) | 23 |

[1] Basic recipe.—50 g. of prepolymer containing 9.2% NCO described in Ex. 1 plus the curing agents indicated above. Balance of procedure according to Ex. 1.
[2] Weight percent of amount theoretically necessary to react with all available NCO groups.
[3] To hard.

NOTE.—"Hylene" is an 80/20 mixture of toluene-2,4-diisocyanate and toluene-2,6-diisocyanate.

As many widely different embodiments of this invention may be made without departing from the spirit and scope thereof, it is to be understood that this invention is not limited to the specific embodiments.

What is claimed is:

1. In an adhered laminated structure dampened against mechanical vibration by constrained layer damping, the improvement wherein the constrained damping layer consists essentially of a clear, uniformly solid polyurethane composition made by reacting an amount W in parts by weight of an aromatic diisocyanate of molecular weight up to about 300, wherein $$W = -A\left(\log_{10} f - \frac{T-25}{10}\right) + B$$

wherein A is between 4 and 7, B is between 40 and 70, $f$ is the frequency of applied vibration in cycles per second, and T is the temperature of use in ° C., with 100 parts by weight of polypropylene ether glycol of number-average molecular weight between 750 and 2500 and an amount by weight of low molecular weight hydroxyl compound selected from the group consisting of aliphatic diol and mixtures of aliphatic diols and aliphatic triols sufficient to react with 70 to 100% of the NCO groups in excess of those required to form a bis-urethane from each molecule of polypropyleneether glycol.

2. In the constrained layer damped structure as recited in claim 1 wherein the molecular weight of said polypropyleneether glycol is between 900 and 1000.

3. In the constrained layer damped structure as recited in claim 1 wherein said diisocyanate is toluene diisocyanate and A is 5.5 and B is 55.

4. In the constrained layer damped structure as recited in claim 1 wherein said diisocyanate is ring dichlorinated toluene diisocyanate and A is 6.8 and B is 66.

5. In the constrained layer damped structure as recited in claim 1 wherein said diisocyanate is methylene bis(4-phenylisocyanate) and A is 6.6 and B is 62.

6. In the constrained layer damped structure as recited in claim 1 wherein T is from about −20 to about diisocyanate and A is 4.5 and B is 53.

7. In the constrained layer damped structure as recited in claim 1 wherein said diisocyanate is paraphenylene diisocyanate and A is 5.0 and B is 44.

8. In the constrained layer damped structure as recited in claim 1 wherein the low molecular weight hydroxyl compound is selected from the group consisting of 1,3-butanediol, neopentyl glycol, and 2-methyl-2-ethyl-1,3-propanediol.

9. In the constrained layer damped structure as recited in claim 1 wherein T is from about −20 to about +80° C.

10. In the constrained layer damped structure as recited in claim 1 wherein $f$ is from 20 to 20,000 cycles per second.

11. In the constrained layer damped structure as recited in claim 1 wherein said constrained layer contains inert filler to give minor adjustment of the dynamic shear modulus.

(References on following page)

References Cited

UNITED STATES PATENTS

| | | | |
|---|---|---|---|
| 2,850,424 | 9/1958 | Finelli et al. | 161—190 |
| 2,864,780 | 12/1958 | Katz et al. | |
| 2,866,774 | 12/1958 | Price. | |
| 2,959,242 | 11/1960 | Muller et al. | |
| 2,981,360 | 4/1961 | Fritze et al. | 181—33 |
| 2,992,939 | 7/1961 | Larson et al. | 161—190 X |
| 3,072,582 | 1/1963 | Frost | 161—190 X |
| 3,160,549 | 12/1964 | Caldwell et al. | 161—190 X |
| 3,208,960 | 9/1965 | Hindersinn, et al. | 161—190 X |
| 3,345,245 | 10/1967 | Hanusa | 161—160 X |
| 3,087,565 | 4/1963 | Kerwin | 181—33 |

EARL M. BERGERT, Primary Examiner

C. B. COSBY, Assistant Examiner

U.S. Cl. X.R.

260—77.5; 181—33

PO-1050
(5/69)

UNITED STATES PATENT OFFICE
CERTIFICATE OF CORRECTION

Patent No. 3,467,572      Dated September 16, 1969

Inventor(s) AHRAMJIAN & YIN

It is certified that error appears in the above-identified patent and that said Letters Patent are hereby corrected as shown below:

In Claim 6, Col. 10, line 55: delete "T is from about -20 to about" and insert therefor -- said diisocyanate is naphthylene --.

SIGNED AND
SEALED
DEC 23 1969

(SEAL)
Attest:

Edward M. Fletcher, Jr.
Attesting Officer

WILLIAM E. SCHUYLER, JR
Commissioner of Patents